United States Patent
Athley et al.

(10) Patent No.: US 10,283,842 B2
(45) Date of Patent: May 7, 2019

(54) WIRELESS COMMUNICATION NODE WITH CROSS-POLARIZED ANTENNAS AND AT LEAST ONE TRANSFORMATION MATRIX ARRANGEMENT

(71) Applicant: TELEFONAKTIEBOLAGET LM ERICSSON (PUBL), Stockholm (SE)

(72) Inventors: Fredrik Athley, Kullavik (SE); Martin Johansson, Mölndal (SE); Andreas Nilsson, Göteborg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 121 days.

(21) Appl. No.: 15/113,318

(22) PCT Filed: Jan. 23, 2014

(86) PCT No.: PCT/EP2014/051313
§ 371 (c)(1),
(2) Date: Jul. 21, 2016

(87) PCT Pub. No.: WO2015/110157
PCT Pub. Date: Jul. 30, 2015

(65) Prior Publication Data
US 2017/0012346 A1    Jan. 12, 2017

(51) Int. Cl.
*H01Q 1/24* (2006.01)
*H04B 7/10* (2017.01)
*H01Q 21/24* (2006.01)

(52) U.S. Cl.
CPC ............ *H01Q 1/243* (2013.01); *H01Q 21/24* (2013.01); *H04B 7/10* (2013.01)

(58) Field of Classification Search
CPC .......... H01Q 1/243; H01Q 3/26; H01Q 21/08; H01Q 1/246; H01Q 21/061
(Continued)

(56) References Cited

U.S. PATENT DOCUMENTS

2003/0092402 A1    5/2003  Shapira et al.
2012/0162008 A1    6/2012  Eom et al.
(Continued)

FOREIGN PATENT DOCUMENTS

WO    2011103918 A1    9/2011
WO    2011103919 A1    9/2011

OTHER PUBLICATIONS

International Search Report and Written Opinion dated Sep. 4, 2014, in International Application No. PCT/EP2014/051313, 11 pages.
(Continued)

*Primary Examiner* — Dameon E Levi
*Assistant Examiner* — Collin Dawkins
(74) *Attorney, Agent, or Firm* — Rothwell, Figg, Ernst & Manbeck, P.C.

(57) ABSTRACT

A node in a wireless communication network, where the node comprises at least one antenna arrangement. Each antenna arrangement in turn comprises at least four antenna devices with corresponding pairs of antenna ports which in turn comprise corresponding first antenna ports and second antenna ports. Each antenna device comprises at least one corresponding dual polarized antenna element arranged for transmitting and/or receiving signals at a first polarization via the corresponding first antenna port and for transmitting and/or receiving signals at a second polarization via the corresponding second antenna port, where the polarizations are mutually orthogonal. Each antenna arrangement further comprises at least a first transformation matrix arrangement which in turn comprises at least four corresponding virtual antenna ports. The antenna ports are at least indirectly connected to each transformation matrix arrangement. Each transformation matrix arrangement is arranged to set a certain polarization state for each corresponding virtual antenna port.

15 Claims, 3 Drawing Sheets

(58) Field of Classification Search
USPC .................................. 343/702, 797, 853, 893
See application file for complete search history.

(56) References Cited

U.S. PATENT DOCUMENTS

| | | | | |
|---|---|---|---|---|
| 2012/0319920 A1* | 12/2012 | Athley | ................... | H01Q 1/246 343/853 |
| 2012/0326928 A1* | 12/2012 | Athley | ................... | H01Q 1/246 342/373 |
| 2014/0242930 A1* | 8/2014 | Barker | ................... | H01Q 1/246 455/129 |

OTHER PUBLICATIONS

European Communication dated Aug. 22, 2018, issued in European Patent Application No. 14701186.0, 5 pages.
European Communication dated Feb. 8, 2019, issued in European Patent Application No. 14701186.0, 5 pages.

* cited by examiner

WIRELESS COMMUNICATION NODE WITH CROSS-POLARIZED ANTENNAS AND AT LEAST ONE TRANSFORMATION MATRIX ARRANGEMENT

CROSS REFERENCE TO RELATED APPLICATION(S)

This application is a 35 U.S.C. § 371 National Phase Entry Application from PCT/EP2014/051313, filed Jan. 23, 2014, designating the United States, the disclosure of which is incorporated herein in its entirety by reference.

TECHNICAL FIELD

The present invention relates to a node in a wireless communication network, where the node comprises at least one antenna arrangement. Each antenna arrangement in turn comprises at least four antenna devices; a first antenna device with a first pair of antenna ports, a second antenna device with a second pair of antenna ports, a third antenna device with a third pair of antenna ports, and a fourth antenna device with a fourth pair of antenna ports. The antenna devices are arranged for transmission and reception within a certain geographical sector. Each pair of antenna ports comprises a corresponding first antenna port and second antenna port. Furthermore, each antenna device comprises at least one corresponding dual polarized antenna element arranged for transmitting and/or receiving signals at a first polarization via the corresponding first antenna port and for transmitting and/or receiving signals at a second polarization via the corresponding second antenna port, where the polarizations are mutually orthogonal. Each antenna arrangement further comprises at least a first transformation matrix arrangement which in turn comprises at least four corresponding virtual antenna ports. The antenna ports are at least indirectly connected to each transformation matrix arrangement.

The present invention also relates to a method for a node in a wireless communication network, using at least four antenna devices for transmission and reception within a certain geographical sector. Each antenna device has a corresponding pair of antenna ports with a corresponding first antenna port and second antenna port, where each first antenna port is used for transmitting and receiving signals at a first polarization and where each second antenna port is used for transmitting and receiving signals at a second polarization.

BACKGROUND

In mobile telephony communication systems, different types of antennas are used for transmission and reception of signals. An ordinary type of antenna is a so-called array antenna where antenna elements are arranged in adjacently arranged columns, one after the other.

Such array antennas are used in several wireless communication standards, e.g. 3GPP LTE, in order to increase system capacity, user throughput, and coverage. The performance benefits of such techniques depend to a large extent on the base station's array antenna properties. In particular, the polarization of the antenna ports and the electrical distance between the antenna ports used for transmission and reception play a vital role in what spatial multiplexing, beamforming, polarization matching and diversity gains that can be achieved in the system. A challenge in the design and choice of base station antennas is that the optimal design depends on several parameters that can change both between sites and over time on the same site. Such parameters can be different in different networks, as well as in different cells in the same network. Examples of such parameters are traffic load, spatial traffic distribution, multipath propagation characteristics, user mobility, ratio of number indoor/outdoor users, etc.

Therefore, the polarization of, and the electrical distance between, antenna ports in a base station array antenna are important design parameters for achieving optimal performance. A problem with existing such antennas is that these parameters are fixed by design. Since the optimal choice of these parameters depend on various factors, such as traffic distribution and propagation characteristics, that can change over time and be different in different cells there is a need for being able to adapt these basic multi-antenna properties to the current situation.

A typical situation today is thus that an operator deploys one or a few antenna types in the entire network and these antennas will reside there for a long time. This relatively pragmatic solution inevitably leads to that a number of compromises needs to be made in the design and choice of base station antennas, resulting in sub-optimal system performance.

There exist reconfigurable antennas which are arranged to can adapt some of their properties to changing scenarios. However, this adaptation is typically limited to radiation pattern properties such as beam width and pointing direction. These antennas are mainly used for cell shaping and load balancing between cells. This is an extremely complex control problem since there exist many inter-dependencies when changing the cell-defining beam patterns in different cells. It is therefore a desire to improving link performance without affecting the cell shape

SUMMARY

It is an object of the present invention to provide a node with at least one re-configurable antenna arrangement where the polarization of, and the electrical distance between, the antenna ports may be changed due to the present communication conditions.

Said object is obtained by means of a node in a wireless communication network, where the node comprises at least one antenna arrangement. Each antenna arrangement in turn comprises at least four antenna devices; a first antenna device with a first pair of antenna ports, a second antenna device with a second pair of antenna ports, a third antenna device with a third pair of antenna ports, and a fourth antenna device with a fourth pair of antenna ports. The antenna devices are arranged for transmission and reception within a certain geographical sector. Each pair of antenna ports comprises a corresponding first antenna port and second antenna port. Furthermore, each antenna device comprises at least one corresponding dual polarized antenna element arranged for transmitting and/or receiving signals at a first polarization via the corresponding first antenna port and for transmitting and/or receiving signals at a second polarization via the corresponding second antenna port, where the polarizations are mutually orthogonal. Each antenna arrangement further comprises at least a first transformation matrix arrangement which in turn comprises at least four corresponding virtual antenna ports. The antenna ports are at least indirectly connected to each transformation matrix arrangement. Each transformation matrix arrangement is arranged to set a certain polarization state for each corresponding virtual antenna port.

Said object is also obtained by means of a method for a node in a wireless communication network, using at least four antenna devices for transmission and reception within a certain geographical sector. Each antenna device has a corresponding pair of antenna ports with a corresponding first antenna port and second antenna port, where each first antenna port is used for transmitting and receiving signals at a first polarization and where each second antenna port is used for transmitting and receiving signals at a second polarization. The method comprises the step of applying a transformation matrix between the antenna ports and virtual antenna ports such that a certain polarization state is set for each corresponding virtual antenna port According to an example, the node comprises at least one control unit that is arranged to control said transformation matrix arrangement.

According to another example, the antenna ports are connected to each transformation matrix arrangement via at least an amplifier arrangement.

According to another example, each antenna arrangement further comprises a second transformation matrix arrangement, which in turn comprises at least four corresponding virtual antenna ports. The antenna ports are connected to the first transformation matrix arrangement via a filter arrangement, which is arranged to, on one hand, at least indirectly transfer signals of a first frequency band between the antenna ports and the first transformation matrix arrangement and, on the other hand, at least indirectly transfer signals of a second frequency band between the antenna ports and the second transformation matrix arrangement.

According to another example, the virtual antenna ports of the first transformation matrix arrangement are arranged for uplink communication, from a user terminal to the node, and the virtual antenna ports of the second transformation matrix arrangement are arranged for downlink communication, from the node to the user terminal.

According to another example, each antenna device comprises a corresponding phase center, the phase centers being separated by corresponding physical distances. Furthermore, each transformation matrix arrangement comprises a first virtual antenna port, second virtual antenna port, third virtual antenna port, and fourth virtual antenna port. Each virtual antenna port has a corresponding virtual phase center.

According to another example, in a first mode of operation, the control unit is arranged to control at least one transformation matrix arrangement such that said first virtual antenna port is set to a first polarization state, said second virtual antenna port is set to a second polarization state, the third virtual antenna port is set to the first polarization state and the fourth virtual antenna port is set to the second polarization state. In this way, each separation between co-polarized virtual phase centers exceeds each one of the physical distances.

For other modes of operation, the control unit is arranged to control at least one transformation matrix arrangement such that the virtual antenna ports are set to other polarization states and combinations of polarization states.

More examples are disclosed in the dependent claims.

A number of advantages are obtained by means of the present invention. Mainly, the present invention enables the virtual antenna ports' polarizations and correlations to be adapted to different environments, deployments and traffic situations. This can increase beamforming, diversity, and spatial multiplexing gains. Furthermore, link performance is improved without affecting the cell shape.

BRIEF DESCRIPTION OF THE DRAWINGS

The present invention will now be described more in detail with reference to the appended drawings, where.

DETAILED DESCRIPTION

Figure 1:
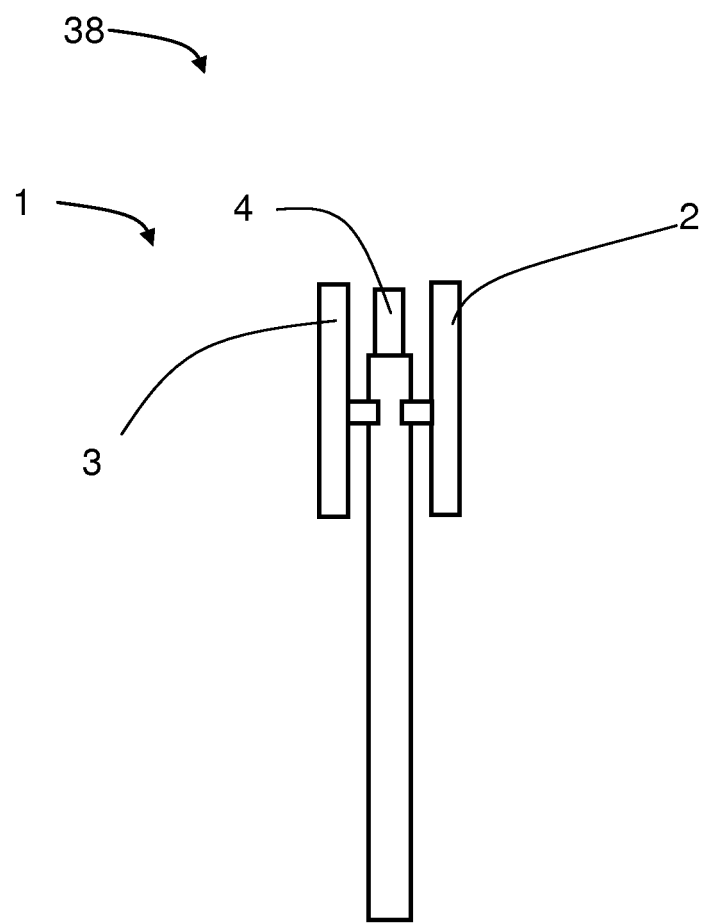
FIG. 1 shows a schematical view of a node in a wireless communication network.

With reference to FIG. 1, there is a node 1 in a wireless communication network 38, the node comprising a first antenna arrangement 2, a second antenna arrangement 3 and a third antenna arrangement 4, where each antenna arrangement 2, 3, 4 is adapted to cover a certain sector in an azimuth plane in a previously known manner.

Figure 2:
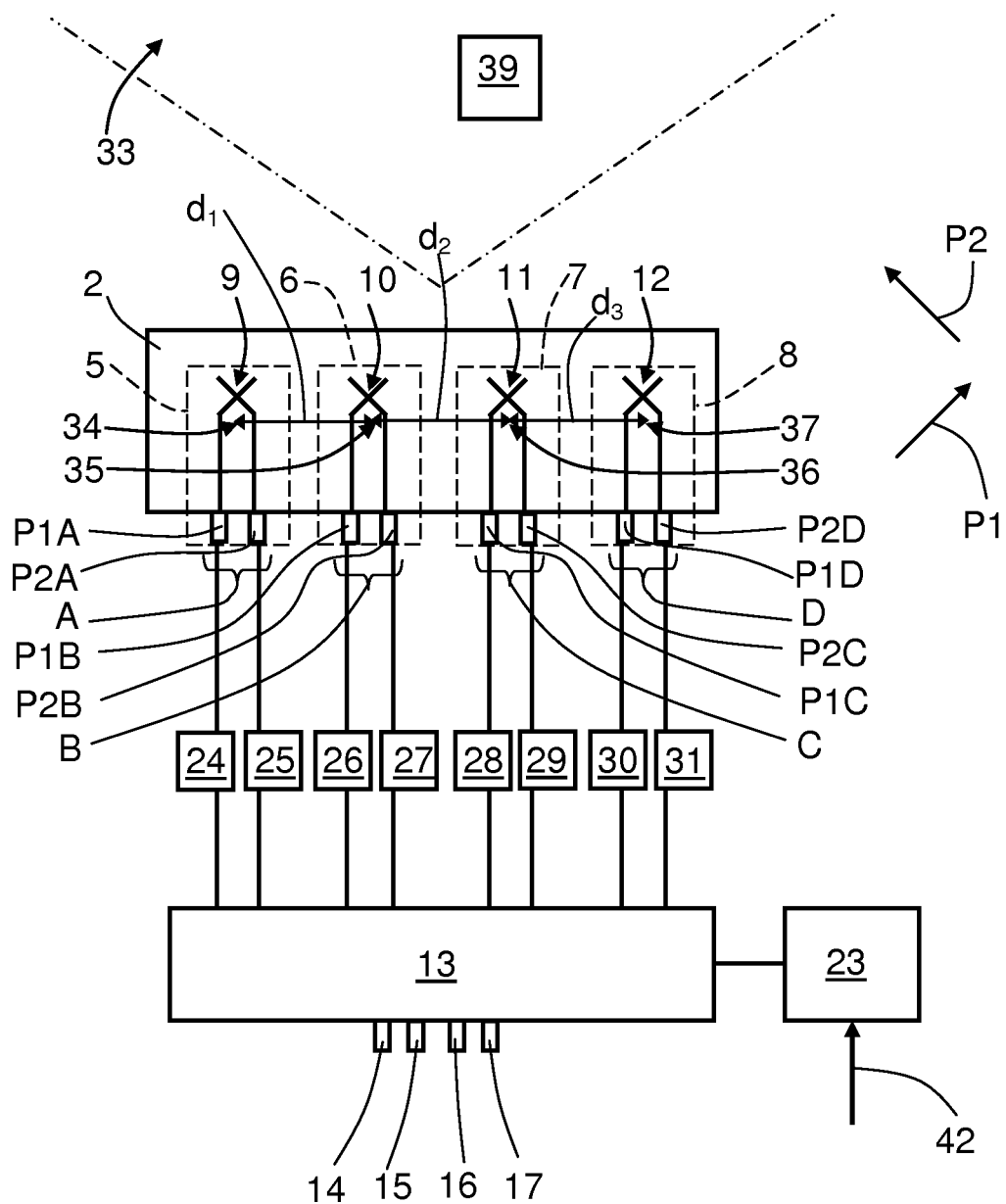
FIG. 2 shows a schematical view of an antenna arrangement according to a first example of the present invention.

In the following, the first antenna arrangement 2 will be described more in detail with reference to FIG. 2, showing a first example, but this description is also valid for the other antenna arrangements 3, 4. The first antenna arrangement 2 comprises a first antenna device 5 with a first pair of antenna ports A and a first phase center 34, a second antenna device 6 with a second pair of antenna ports B and a second phase center 35, a third antenna device 7 with a third pair of antenna ports C and a third phase center 36, and a fourth antenna device 8 with a fourth pair of antenna ports D and a fourth phase center 37. The first phase center 34 and the second phase center 35 are separated by a first distance $d_1$, the second phase center 35 and the third phase center 36 are separated by a second distance $d_2$, and the third phase center 36 and the fourth phase center 37 are separated by a third distance $d_3$. For example, these distances $d_1$, $d_2$, $d_3$ may be equal. In the following, it will be assumed that is the case, i.e. $d_1=d_2=d_3=d$.

Each pair of antenna ports A, B, C, D comprises a corresponding first antenna port P1A, P1B, P1C, P1D and second antenna port P2A, P2B, P2C, P2D. This means that the first pair of antenna ports A comprises a corresponding first antenna port P1A and second antenna port P2A, the second pair of antenna ports B comprises a corresponding first antenna port P1B and second antenna port P2B, the third pair of antenna ports C comprises a corresponding first antenna port P1C and second antenna port P2C, and finally that the fourth pair of antenna ports D comprises a corresponding first antenna port P1D and second antenna port P2D.

Furthermore, each antenna device 5, 6, 7, 8 comprises at least one corresponding dual polarized antenna element 9, 10, 11, 12 arranged for transmitting and/or receiving signals at a first polarization P1 via the corresponding first antenna port P1A, P1B, P1C, P1D and for transmitting and/or receiving signals at a second polarization P2 via the corresponding second antenna port P2A, P2B, P2C, P2D. The polarizations P1, P2 are mutually orthogonal.

This means that the first antenna device 5 comprises at least one corresponding dual polarized antenna element 9, the second antenna device 6 comprises at least one corresponding dual polarized antenna element 10, the third antenna device 7 comprises at least one corresponding dual polarized antenna element 11, and that the fourth antenna device 8 comprises at least one corresponding dual polarized antenna element 12. In FIG. 2, only one dual polarized antenna element is shown for each antenna device, but there may be a plurality of dual polarized antenna elements for each antenna device. Each dual polarized antenna element as shown in FIG. 2, and also in FIG. 3 (showing a second example), may then be regarded as representing a plurality of dual polarized antenna elements, for example in the form of an antenna column.

The first antenna arrangement 2 further comprises a first transformation matrix arrangement 13 which in turn comprises a first virtual antenna port 14, a second virtual antenna port 15, a third virtual antenna port 16 and a fifth virtual antenna port 17. The antenna ports P1A, P1B, P1C, P1D; P2A, P2B, P2C, P2D are connected to the first transformation matrix arrangement 13 via a corresponding amplifier arrangement 24, 25, 26, 27, 28, 29, 30, 31.

According to the present invention, the first transformation matrix arrangement 13 is arranged to set a certain polarization state for each corresponding virtual antenna port 14, 15, 16, 17. The node comprises a control unit 23 that is arranged to control the first transformation matrix arrangement 13.

The weights in the first transformation matrix arrangement 13 are determined by a control unit 23, for example based on inputs 42, for example in the form of various KPI:s (Key Performance Indicators) and scenario parameters. The first transformation matrix arrangement 13 is thus arranged to perform a virtual antenna port mapping that can change the properties of the antenna ports P1A, P1B, P1C, P1D; P2A, P2B, P2C, P2D in a desired way. The properties in question are the polarization state of the virtual antenna ports 14, 15, 16, 17 and the phase center distance between co-polarized virtual antenna ports 14, 15, 16, 17.

In the following, four examples will be given of different virtual antenna port mappings that creates a set of vertically and horizontally polarized virtual antenna ports 14, 15, 16, 17 from a set of ±45° polarized physical antenna ports P1A, P1B, P1C, P1D; P2A, P2B, P2C, P2D. Since the power of all weights sum up to one, all amplifier arrangements 24, 25, 26, 27, 28, 29, 30, 31 are fully utilized in these mappings, assuming one PA per physical antenna port.

In the examples, the virtual antenna ports 14, 15, 16, 17 correspond to a vector y, the physical antenna ports P1A, P1B, P1C, P1D; P2A, P2B, P2C, P2D correspond to a vector x and weights in the first transformation matrix arrangement 13 are defined by a weight matrix W. The virtual antenna ports 14, 15, 16, 17 are thus calculated as:

$$y = Wx, \quad (1)$$

where $$x = \begin{bmatrix} P1A \\ P2A \\ P1B \\ P2B \\ P1C \\ P2C \\ P1D \\ P2D \end{bmatrix}. \quad (2)$$

In a first weight matrix example, a first weight matrix $W_1$ has the following form:

$$W_1 = \begin{bmatrix} 1 & 1 & 0 & 0 & 0 & 0 & 0 & 0 \\ 0 & 0 & -1 & 1 & 0 & 0 & 0 & 0 \\ 0 & 0 & 0 & 0 & 1 & 1 & 0 & 0 \\ 0 & 0 & 0 & 0 & 0 & 0 & -1 & 1 \end{bmatrix} \quad (3)$$

This will provide a vertical polarization state for the first virtual antenna port 14 and the third virtual antenna port 16, and a horizontal polarization state for the second virtual antenna port 15 and the fourth virtual antenna port 17. The separation between co-polarized virtual antenna ports is then 2d, where d is the separation between the physical antenna phase centers as mentioned above. The increased separation de-correlates the antenna ports, which increases the potential gains with diversity and spatial multiplexing.

In a second weight matrix example, a second weight matrix $W_2$ has the following form:

$$W_2 = \begin{bmatrix} 1 & 1 & 0 & 0 & 0 & 0 & 0 & 0 \\ 0 & 0 & 1 & 1 & 0 & 0 & 0 & 0 \\ 0 & 0 & 0 & 0 & -1 & 1 & 0 & 0 \\ 0 & 0 & 0 & 0 & 0 & 0 & -1 & 1 \end{bmatrix} \quad (4)$$

This will provide a vertical polarization state for the first virtual antenna port 14 and the second virtual antenna port 15, and a horizontal polarization state for the third virtual antenna port 16 and the fourth virtual antenna port 17. The second weight matrix example is similar to the first weight matrix example, except that the separation between two co-polarized virtual antenna ports is reduced. By having the virtual antenna ports closer to each other, a more reliable beamforming gain can be utilized which may increase the SNR (Signal to Noise Ratio) for user terminals 39. This mapping could be useful for example if the majority of the user terminals in a cell are located inside buildings with high wall penetration loss where SNR typically is quite low.

In a third weight matrix example, a third weight matrix $W_3$ has the following form:

$$W_3 = \begin{bmatrix} -1 & 1 & 0 & 0 & 0 & 0 & 0 & 0 \\ 0 & 0 & -1 & 1 & 0 & 0 & 0 & 0 \\ 0 & 0 & 0 & 0 & -1 & 1 & 0 & 0 \\ 0 & 0 & 0 & 0 & 0 & 0 & -1 & 1 \end{bmatrix} \quad (5)$$

This will provide a horizontal polarization state for all virtual antenna ports 14, 15, 16, 17.

In a fourth weight matrix example, a fourth weight matrix $W_4$ has the following form:

$$W_4 = \begin{bmatrix} 1 & 1 & 0 & 0 & 0 & 0 & 0 & 0 \\ 0 & 0 & 1 & 1 & 0 & 0 & 0 & 0 \\ 0 & 0 & 0 & 0 & 1 & 1 & 0 & 0 \\ 0 & 0 & 0 & 0 & 0 & 0 & 1 & 1 \end{bmatrix} \quad (6)$$

This will provide a vertical polarization state for all virtual antenna ports 14, 15, 16, 17.

The communication link between the node 1 and user terminal 39 in urban scenarios typically relies on the electromagnetic waves to be diffracted around the edges of shadowing buildings, where the amount of diffracted energy has been found to depend on the polarization. Typically, the polarization parallel to a metallic edge suffers more loss than the polarization perpendicular to the edge. Depending on if the signals from the node 1 mainly propagate around buildings or above buildings, either the third weight matrix example or the fourth weight matrix example could be used, respectively, to improve the signal strength of the communication link between the node 1 and the user terminals 39.

There are many ways to choose how to define weight matrices. As a first example of defining a weight matrix, there is a fixed set of a finite number of weight matrices corresponding to virtual antenna port mappings to select from. Each mapping is associated with a set of properties. Based on prioritized KPI:s, system measurements, and knowledge of the cell's propagation characteristics, the desired properties of the virtual antenna port mapping is identified and a virtual antenna port mapping that has the desired properties is selected.

As a second example of defining a weight matrix, there is also a fixed set of a finite number of weight matrices corresponding to virtual antenna port mappings to select from, but in this case each mapping is applied for some period of time and the prioritized KPI:s are measured during this time. When all virtual antenna port mappings have been tested, the one that optimizes the presently prioritized KPI:s is selected. In order to speed up the optimization, a reduced set of virtual antenna port mappings can be used. In order to obtain more reliable and less disruptive measurements, the measurement can be interleaved in time so that measurements for one virtual antenna port mapping is performed during a shorter time period but repeated several times.

As a third example of defining a weight matrix, there is no fixed set of a finite number of weight matrices corresponding to virtual antenna port mappings to choose from. In this case, the weight matrix is optimized by changing the weights in the matrix and measuring the impact on the prioritized KPI:s.

The control unit 23 can operate in many different modes, two examples of different modes will now be described:

According to a first mode of operation, the control unit 23 is arranged to use a priori knowledge of the scenario where a virtual antenna port mapping is selected based on a rule set. Some examples of such a priori knowledge are A majority of users in a cell are indoors and have high propagation loss;
The traffic load in the cell is high;
There is strong interference from other cells; and
The angular spread in the channel is high.
Some examples of rules in the rule set are
If the traffic load is high, and there is strong interference from other cells, choose a virtual antenna port mapping that gives correlated virtual antenna ports, such as for example by means of the second weight matrix $W_2$ or the fourth weight matrix $W_4$ in the examples above.
If the traffic load is low and there is weak interference from other cells, choose a virtual antenna port mapping that gives uncorrelated virtual antenna ports, such as for example by means of the first weight matrix $W_1$ in the examples above.

The selection and possibly re-selection of port mapping can for example be made on different time scales. For example:

A mapping is chosen at deployment based on knowledge of the physical surroundings, propagation characteristics and the expected traffic distribution. This mapping is fixed, but can be changed when there is a sudden change in the conditions, e.g., a new building or new neighbor site.
The mapping is changed regularly due to regular changes in the cell, e.g., commuter patterns, regular events, traffic load variations, etc.
The mapping is changed when there is an unpredicted change in the cell, e.g., a sudden crowd gathering, a traffic jam, etc. The control function monitors various system measurements in order to be able to detect such changes.

According to a second mode of operation, the control unit 23 is arranged to select virtual antenna port mapping by means of an optimization process. The optimization can be performed in two different ways:

Different virtual antenna port mappings are applied during a measurement period, and prioritized KPI:s are measured and used as input 42 during this time. When all antenna port mappings have been tested, the best one is selected.
A change in the weights in the weight matrix is applied and the impact on the prioritized KPI:s is measured and used as input 42. If the change causes an improvement, the new weights are used; otherwise the change is reverted.

Figure 3:
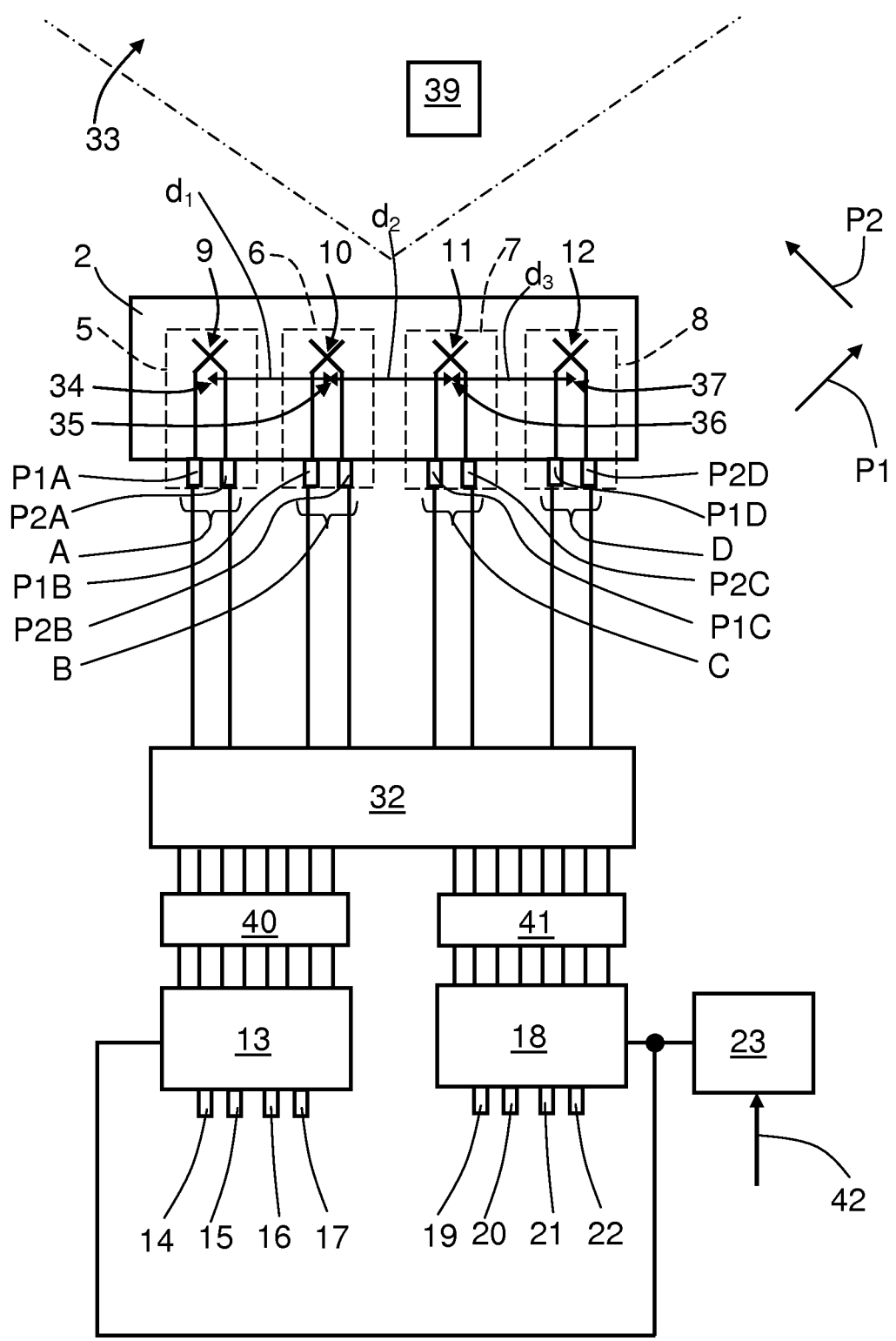
FIG. 3 shows a schematical view of an antenna arrangement according to a second example of the present invention.

With reference to FIG. 3, the reconfiguration can be done independently for uplink and downlink. Here, the first each antenna arrangement 2, in addition to the first transformation matrix arrangement 13, further comprises a second transformation matrix arrangement 18 which in turn comprises at least four corresponding virtual antenna ports 19, 20, 21, 22. Here, the antenna ports P1A, P1B, P1C, P1D; P2A, P2B, P2C, P2D are connected to the first transformation matrix arrangement 13 via a filter arrangement 32. The filter arrangement 32 is arranged to, on one hand, at least indirectly transfer signals of a first frequency band $f_1$ between the antenna ports P1A, P1B, P1C, P1D; P2A, P2B, P2C, P2D and the first transformation matrix arrangement 13 and, on the other hand, at least indirectly transfer signals of a second frequency band $f_2$ between the antenna ports P1A, P1B, P1C, P1D; P2A, P2B, P2C, P2D and the second transformation matrix arrangement 18.

The virtual antenna ports 14, 15, 16, 17 of the first transformation matrix arrangement 13 are arranged for uplink communication, from a user terminal 39 to the node 1 at the first frequency band $f_1$. The virtual antenna ports 19, 20, 21, 22 of the second transformation matrix arrangement 18 are arranged for downlink communication, from the node 1 to the user terminal 39 at the second frequency band $f_2$.

In this case, there is a uplink amplifying arrangement 40 between the filter arrangement 32 and the first transformation matrix arrangement 13, where the uplink amplifying arrangement 40 comprises LNA:s (Low Noise Amplifiers). Furthermore, there is a downlink amplifying arrangement 41 between the filter arrangement 32 and the second transformation matrix arrangement 18, where the downlink amplifying arrangement 41 comprises PA:s (Power Amplifiers).

It is to be noted that the amplifying arrangements 40, 41 and the filter arrangement 32 are shown as simplified blocks in FIG. 3, those parts being well-known in the art.

Making the antenna reconfiguration independently for uplink and downlink can be useful in scenarios where the optimal antenna properties are different for uplink and downlink.

The present invention thus provides a reconfigurable antenna arranged to adapt the virtual antenna ports' polarizations and correlation to the current situation. The antenna architecture consists of a plurality of dual-polarized antenna elements 9, 10, 11, 12 which are transformed to at least one set of virtual antenna ports 14, 15, 16, 17; 19, 20, 21, 22 used in the data transmission and/or reception by means of an appropriate weight matrix W in the first transformation matrix arrangement 13. The weights of the transformation matrix W are determined by a control unit in such a way that the desired polarization and correlation properties of the antenna ports are obtained. The antenna polarization and correlation properties of an antenna arrangement 2, 3, 4 will be the same for all users in a cell 33, but can change over time and be different in different cells.

The present invention is not limited to the examples above, but may vary freely within the scope of the appended claims. For example the node may comprise more or less antenna arrangements then those described in the examples above, each antenna arrangement being arranged to cover a certain sector. Furthermore, each antenna arrangement may comprise more than four antenna devices. The sector or sectors do not have to lie in an azimuth plane, by may lie in any suitable plane, such as for example an elevation plane. The antenna device 5, 6, 7, 8 are positioned in a row one after the other, where the row may lie in any suitable plane such as a horizontal plane or a vertical plane.

The antenna elements of each antenna arrangement 2 may be in the form of a one-dimensional array antenna or in the form of a two-dimensional array antenna. Each physical antenna element may in turn be constituted by several sub-elements or even sub-arrays.

Terms such as equal and orthogonal should in this context not be interpreted as mathematically exact, but within what is practically obtainable in this field of technology.

Generally, due to the optional presence and/or placement of components such as amplifying devices and/or filter devices, as well as other possible components which are well-known in the art but not discussed here, the antenna ports are at least indirectly connected to at least one respective transformation matrix arrangement, which means that the antenna ports either may be directly connected to at least one transformation matrix arrangement, or connected to at least one respective transformation matrix arrangement via at least one other component.

The filter devices may be of any suitable kind, such as duplex filters.

The transformation matrix arrangements 13, 18 used may be realized in any suitable form; digital, hardware or a combination. All these varieties that are conceivable for accomplishing the present invention, are well-known in the art, and are in practice used for performing matrix multiplications in order to obtain virtual antenna ports from physical antenna ports. The present invention does thus not lie in the exact configuration of the transformation matrix arrangements 13, 18 used, but in the use of one or more transformation matrix arrangements 13, 18 of a previously known kind to change the polarizations state of virtual antenna ports at said transformation matrix arrangements 13, 18, which provides a number of benefits.

The present invention applies not only to three-sector systems, but to any type of suitable wireless communication network.

The weight matrix W has been shown comprising only real numbers in the form of integers and zeroes in order to illustrate a number of examples, but may comprise any suitable complex number at any suitable position in order to achieve desired polarization states at the virtual antenna port 14, 15, 16, 17; 19, 20, 21, 22.

There may be more or less than the shown three antenna arrangements 2, 3, 4 at the node 1.

The distances $d_1$, $d_2$, $d_3$ between the phase centers 34, 35, 36, 37 may be equal, as in the examples above, or unequal. For example, two distances may be equal and one may differ from these.

A cell generally constitutes a geographical sector.

The polarizations P1, P2 are shown as ±45° polarized, but may have any suitable orthogonal polarizations, such as for example 0° and 90°. How the polarizations P1, P2 are configured naturally affects the weight matrix W.

The invention claimed is:

1. A node in a wireless communication network, the node comprising:
an antenna arrangement, wherein the antenna arrangement comprises a first antenna device with a first pair of antenna ports, a second antenna device with a second pair of antenna ports, a third antenna device with a third pair of antenna ports, and a fourth antenna device with a fourth pair of antenna ports,
wherein each pair of antenna ports comprises a first antenna port and a second antenna port,
wherein each of the antenna devices is configured for transmission and reception within a certain geographical sector and comprises at least one dual polarized antenna element arranged for transmitting and/or receiving signals at a first polarization via the corresponding first antenna port and for transmitting and/or receiving signals at a second polarization via the corresponding second antenna port, and
wherein the polarizations are mutually orthogonal;
a first transformation matrix arrangement comprising a first virtual antenna port, a second virtual antenna port, a third virtual antenna port, and a fourth virtual antenna port,
wherein the antenna ports are connected to the first transformation matrix arrangement; and
a control unit configured to control the first transformation matrix arrangement such that a polarization state for each of the virtual antenna ports is set, wherein the control unit controls the first transformation matrix arrangement by performing a process comprising determining a weight matrix of the first transformation matrix arrangement,
wherein the antenna arrangement further comprises:
a second transformation matrix arrangement comprising a fifth virtual antenna port, a sixth virtual antenna port, a seventh virtual antenna port, and an eighth virtual antenna port, and
a filter arrangement, wherein the antenna ports are connected to the first transformation matrix arrangement and the second transformation matrix arrangement via the filter arrangement, and wherein the filter arrangement is configured to transfer signals of a first frequency band between the antenna ports and the first transformation matrix arrangement and/or transfer signals of a second frequency band between the antenna ports and the second transformation matrix arrangement.

2. The node according to claim 1, wherein the antenna ports are connected to the first transformation matrix arrangement via an amplifier arrangement.

3. The node according to claim 1, wherein the virtual antenna ports of the first transformation matrix arrangement are configured for uplink communication, from a user terminal to the node, and wherein the virtual antenna ports of the second transformation matrix arrangement are configured for downlink communication, from the node to the user terminal.

4. The node according to claim 1, wherein the first antenna device comprises a first phase center, the second antenna device comprises a second phase center, the third antenna device comprises a third phase center, and the fourth antenna device comprises a fourth phase center,
wherein the first phase center and the second phase center are separated by a first physical distance, the second phase center and the third phase center are separated by a second physical distance, and the third phase center and the fourth phase center are separated by a third physical distance, and wherein each of the first virtual antenna port, second virtual antenna port, third virtual antenna port, fourth virtual antenna port, fifth virtual point, sixth virtual point, seventh virtual point, and eighth virtual point has a virtual phase center.

5. The node according to claim 4, wherein in a first mode of operation, the control unit is configured to at least one of: (1) control the first transformation matrix arrangement such that said first virtual antenna port is set to a first polarization state, said second virtual antenna port is set to a second polarization state, the third virtual antenna port is set to the first polarization state and the fourth virtual antenna port is set to the second polarization state and (2) control the second transformation matrix arrangement such that said fifth virtual antenna port is set to the first polarization state, said sixth virtual antenna port is set to the second polarization state, the seventh virtual antenna port is set to the first polarization state and the eighth virtual antenna port is set to the second polarization state, such that each separation between co-polarized virtual phase centers exceeds each one of the physical distances.

6. The node according to claim 4, wherein, in a second mode of operation, the control unit is configured to at least one of: (1) control the first transformation matrix arrangement such that said first virtual antenna port is set to a third polarization state, said second virtual antenna port is set to the third polarization state, the third virtual antenna port is set to a fourth polarization state and the fourth virtual antenna port is set to the fourth polarization state and (2) control the second transformation matrix arrangement such that said fifth virtual antenna port is set to the third polarization state, said sixth virtual antenna port is set to the third polarization state, the seventh virtual antenna port is set to the fourth polarization state and the eighth virtual antenna port is set to the fourth polarization state.

7. The node according to claim 4, wherein, in a third mode of operation, the control unit is configured to control at least one of the first transformation matrix arrangement and the second transformation matrix arrangement such that all said virtual antenna ports are set to a common polarization state.

8. The node of claim 1, wherein the first transformation matrix arrangement is further configured to set phase center distances between co-polarized virtual antenna ports.

9. A method for a node in a wireless communication network, using an antenna arrangement comprising a first antenna device with a first pair of antenna ports, a second antenna device with a second pair of antenna ports, a third antenna device with a third pair of antenna ports, and a fourth antenna device with a fourth pair of antenna ports, wherein each of the antenna devices is configured for transmission and reception within a certain geographical sector, and wherein each pair of antenna ports comprises a first antenna port and a second antenna port, each first antenna port being used for transmitting and receiving signals at a first polarization and each second antenna port being used for transmitting and receiving signals at a second polarization, the method comprising:

applying a transformation matrix comprising a first virtual antenna port, a second virtual antenna port, a third virtual antenna port, and a fourth virtual antenna port, wherein the transformation matrix is applied between the pairs of antenna ports and the virtual antenna ports, and wherein a weight matrix of the transformation matrix is determined such that a polarization state for each of the virtual antenna ports is set, wherein the antenna arrangement further comprises:

a second transformation matrix arrangement comprising a fifth virtual antenna port, a sixth virtual antenna port, a seventh virtual antenna port, and an eighth virtual antenna port, and a filter arrangement, wherein the antenna ports are connected to the first transformation, matrix arrangement and the second transformation matrix arrangement via the filter arrangement, and wherein the filter arrangement is configured to transfer signals of a first frequency band between the antenna ports and the first transformation matrix arrangement and/or transfer signals of a second frequency band between the antenna ports and the second transformation matrix arrangement.

10. The method according to claim 9, wherein for a first mode of operation, the method comprises:

setting the first virtual antenna port to a first polarization state;

setting the second virtual antenna port to a second polarization state;

setting the third virtual antenna port to the first polarization state; and setting the fourth virtual antenna port to the second polarization state, such that each separation between virtual phase centers of co-polarized virtual antenna ports exceeds each separation between phase centers of adjacent antenna devices.

11. The method according to claim 9, wherein for a second mode of operation the method comprises:

setting the first virtual antenna port to a third polarization state;

setting the second virtual antenna port to the third polarization state;

setting the third virtual antenna port to a fourth polarization state; and setting the fourth virtual antenna port to the fourth polarization state.

12. The method according to claim 9, wherein for a third mode of operation the method comprises setting all virtual antenna ports to a common polarization state.

13. The method according to claim 9, wherein the polarization state is set for each corresponding virtual antenna port in dependence of monitored parameters.

14. The method according to claim 9, wherein the polarization state is set for each corresponding virtual antenna port by trying different polarization states and monitoring which combination of polarization states that provides the best communication properties.

15. The method of claim 9, wherein the transformation matrix further configured to set phase center distances between co-polarized virtual antenna ports.

* * * * *